United States Patent
Kaushik

(10) Patent No.: US 12,392,409 B2
(45) Date of Patent: Aug. 19, 2025

(54) SWASH PLATE BRAKING

(71) Applicant: Zimeno Inc., Livermore, CA (US)

(72) Inventor: Karan Kaushik, Fremont, CA (US)

(73) Assignee: Zimeno Inc., Livermore, CA (US)

( * ) Notice: Subject to any disclaimer, the term of this patent is extended or adjusted under 35 U.S.C. 154(b) by 0 days.

(21) Appl. No.: 18/527,126

(22) Filed: Dec. 1, 2023

(65) Prior Publication Data

US 2024/0183443 A1  Jun. 6, 2024

Related U.S. Application Data

(60) Provisional application No. 63/429,190, filed on Dec. 1, 2022.

(51) Int. Cl.
| | |
|---|---|
| *F16H 61/46* | (2010.01) |
| *B60T 1/10* | (2006.01) |
| *F16H 61/433* | (2010.01) |

(52) U.S. Cl.
CPC ............... *F16H 61/46* (2013.01); *B60T 1/10* (2013.01); *F16H 61/433* (2013.01); *B60Y 2300/18125* (2013.01)

(58) Field of Classification Search
CPC . B60T 1/10; B60T 10/04; B60Y 2300/18125; B60Y 2300/91
See application file for complete search history.

(56) References Cited

U.S. PATENT DOCUMENTS

| | | | |
|---|---|---|---|
| 6,170,587 B1 * | 1/2001 | Bullock | B60K 6/365 |
| | | | 903/910 |
| 11,052,881 B1 * | 7/2021 | Chen | B60K 31/08 |
| 2006/0000207 A1 | 1/2006 | Rush | |
| 2009/0173066 A1 | 7/2009 | Duray | |
| 2016/0193916 A1 * | 7/2016 | Kassube | B60K 17/354 |
| | | | 74/664 |
| 2017/0335867 A1 | 11/2017 | Meehan et al. | |
| 2020/0079221 A1 * | 3/2020 | Ferri | B60W 10/06 |

OTHER PUBLICATIONS

International Search Report and Written Opinion for PCT/US2023/082179; mail date Jun. 6, 2024; 9 pages.

* cited by examiner

*Primary Examiner* — Thomas E Lazo
(74) *Attorney, Agent, or Firm* — Rathe Lindenbaum LLP

(57) ABSTRACT

A vehicle may include an electric motor, a variable displacement hydraulic pump having a swash plate, driven traction members, a transmission operably coupling the electric motor to the driven traction members and to the hydraulic pump, a hydraulic pressure consumer fluidly coupled to an output of the hydraulic pump, a battery to receive energy produced by the electric motor during braking of the driven traction members by the electric motor and a controller. The controller is configured to adjust an angle of the swash plate in response to a sensed state of the battery and braking of the driven traction members.

17 Claims, 2 Drawing Sheets

SWASH PLATE BRAKING

CROSS-REFERENCE TO RELATED PATENT APPLICATIONS

The present non-provisional application claims benefit from U.S. provisional patent Application Ser. No. 63/429,190 filed on Dec. 1, 2022, by Karan Kaushi and entitled SWASH PLATE BRAKING, the full disclosure of which is hereby incorporated by reference.

BACKGROUND

Electric vehicles utilize an electric motor to provide torque for propulsion of the vehicle. Some electric vehicles may employ regenerative braking, wherein the electric motor functions as a generator during braking to output electrical energy.

Figure 1:
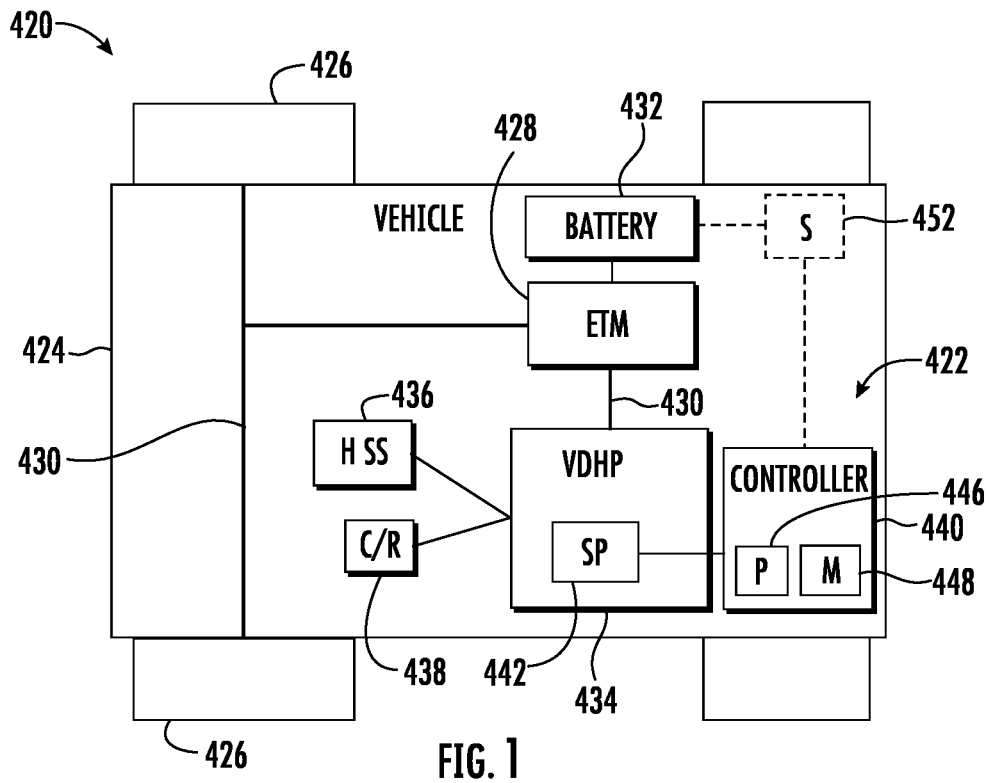
FIG. 1 is a diagram schematically illustrating portions of an example vehicle having an example vehicle braking system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example vehicle control systems, vehicles and methods that provide enhanced vehicle braking performance for vehicles driven by an electric motor. Vehicles, especially heavy off-road vehicles, such as agricultural vehicles and tractors, carry a lot of kinetic energy which must be dissipated into a different form of energy for the vehicle to slow down or brake. Vehicles driven within electric motor may employ regenerative braking, wherein the electric motor functions as a generator during braking and wherein the electrical power produced by the generator is used to recharge the vehicle's battery. Such regenerative braking may not be available when the battery is nearly fully charged.

The disclosed example control systems, vehicles and methods facilitate continued braking of the vehicle in circumstances where regenerative braking is not available or is less effective. The disclosed examples dissipate kinetic energy of the vehicle during braking into heat or other forms by using a continuously variable hydraulic pump and adjusting the angle of its swash plate to impose a load upon the electric motor, wherein the resulting pressurized hydraulic fluid is forced through a narrow passage, such as through a variable orifice valve, producing the heat. The load imposed upon the motor assists in slowing the vehicle down in a controlled and smooth manner. This load may also assist in speed control of the vehicle when the vehicle is traveling upon a gradient.

The disclosed examples adjust the angle of the swash plate in response to a sensed state of the battery and braking of driven traction members of the vehicle. The driven traction members may be in the form of wheels or tracks. In some implementations, a controller is used to adjust the angle of the swash plate in response to a state of charge of the battery exceeding a predetermined battery charge level. In some implementations, the predetermined battery charge level comprises 90% of the charge capacity of the battery.

In some implementations, the sensed state of the battery comprises a voltage level of the battery. The controller may be configured to adjust the angle swash plate in response to the voltage level of the battery exceeding a predetermined battery voltage level. In some implementations, the predetermined battery maximum cell voltage level comprises a value of at least 4200 mV, and in some implementations, a value of at least 4250 mV.

In some implementations, the controller adjusts the angle of the swash plate to provide a load up to 25 KW. In some implementations, the controller adjust the angle of the swash plate to provide a load up to 28 KW. Such load depends upon the motor RPM and the plate angle.

In some implementations, the hydraulic pump is mechanically connected to the electric motor which serves as a traction motor. In some implementations, the hydraulic pump may be used to drive forward or front steered wheels, and to power and hydraulically drive hydraulic subsystems, such as attachments (i.e., a front loader) or implements associated with the vehicle.

In circumstances where no hydraulic flow is being used to drive such attachments or implements, the swash plate may remain a 0% travel, imposing no or little load upon the traction motor. During braking, in response to the state of charge or voltage level of the battery exceeding a predetermined threshold, such that regenerative braking may not be available or may be inefficient, the angle of the swash plate may be controlled or adjusted against the internal hydraulic circuit without actuating any hydraulic subsystems. In circumstances where hydraulic subsystems are utilizing hydraulic flow, a first portion of the pressurized hydraulic fluid flow produced by the hydraulic pump during such braking may be used to hydraulically power the hydraulic subsystems and a second portion of the pressurized hydraulic fluid flow produced by the hydraulic pump during such braking may be directed (with the valve or the like) through the narrow restriction or main relief.

For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

For purposes of this disclosure, unless otherwise explicitly set forth, the recitation of a "processor", "processing unit" and "processing resource" in the specification, independent claims or dependent claims shall mean at least one processor or at least one processing unit. The at least one processor or processing unit may comprise multiple individual processors or processing units at a single location or distributed across multiple locations.

For purposes of this disclosure, the phrase "configured to" denotes an actual state of configuration that fundamentally ties the stated function/use to the physical characteristics of the feature proceeding the phrase "configured to".

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this, unless explicitly recited to the contrary, recitations reciting that signals "indicate" a value or state means that such signals either directly indicate a value, measurement or state, or indirectly indicate a value, measurement or state. Signals that indirectly indicate a value, measure or state may serve as an input to an algorithm or calculation applied by a processing unit to output the value, measurement or state. In some circumstances, signals may indirectly indicate a value, measurement or state, wherein such signals, when serving as input along with other signals to an algorithm or calculation applied by the processing unit may result in the output or determination by the processing unit of the value, measurement or state.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

FIG. 1 schematically illustrates an example electrically driven or propelled vehicle 420 comprising an example a vehicle braking control system 422 for carrying out an example steering control method 500 (shown in FIG. 7). Vehicle 420 may be in the form of an agricultural vehicle (a tractor, a harvester, self-propelled sprayer or the like), a passenger vehicle (car or truck) or another self-propelled vehicle.

Vehicle braking control system 422 facilitates continued braking of the vehicle in circumstances where regenerative braking is not available or is less effective. Vehicle braking control system 422 dissipates kinetic energy of the vehicle 420 during braking into heat or other forms by using a continuously variable hydraulic pump and adjusting the angle of its swash plate to impose a load upon the electric motor, wherein the resulting pressurized hydraulic fluid is forced through a narrow constriction or a main relief, producing the heat. The load imposed upon the motor assists in slowing the vehicle down in a controlled and smooth manner. This load may also assist in speed control of the vehicle when the vehicle is traveling upon a gradient.

Vehicle 420 comprises frame 424, driven traction members 426 electric traction motor 428, transmission 430, battery 432, variable displacement hydraulic pump 434, hydraulic subsystems 436, compensator/relief 438 and controller 440. Frame 424 rotatably or movably supports ground engaging or traction members 426 which may be in the form of wheels or tracks. In some implementations, driven traction members 426 are located at a rearward portion of vehicle 420. In other implementations, driven traction members 426 are located at a forward portion of vehicle 420.

Electric traction motor 428 comprises an electric motor operably coupled to driven traction members 426 by transmission 430 and operably coupled to variable displacement hydraulic pump 434 by transmission 430. Transmission 430 transmits torque from motor 428 to drive or propel traction members 426. In circumstances, transmission 430 further transmits torque from motor 428 to pump 434 to drive pump 434. Electric traction motor 428 is supplied with electrical power energy from battery 432. Battery 432 may comprise a battery pack comprising several sets of rechargeable batteries of sufficient power and sized to electrically power motor 428 so as to generate sufficient torque for propelling vehicle 420. Transmission 430 is configured such that during braking of vehicle 420, electric traction motor 428 functions as a generator producing electrical power which may be used to recharge battery 432 (referred to as regenerative braking).

Variable displacement hydraulic pump 434 comprises a pump configured to supply pressurized hydraulic fluid flow to hydraulic subsystems 436 and/or compensator/relief 438. Hydraulic pump 434 comprises a swash plate 442 which is operably coupled to motor 428 so as to be rotatably driven by torque output by motor 428. This load is imposed by adjusting the oil flow and the pressure drop of the hydraulic fluid flowing through the output of pump 434.

Hydraulic subsystems 436 comprise systems of vehicle 420 or external systems powered by the hydraulic pump 434 of vehicle 420. Such hydraulic subsystems may include hydraulic cylinder-piston assemblies for physically moving, raising and/or lowering components. One example of a hydraulic subsystem 436 are hydraulic cylinder-piston assemblies used to actuate a bucket, fork or other attachment of a front or rear loader. In some implementations, hydraulic subsystems 436 may be such as where pump 434 is solely used for braking.

Compensator/relief 438 is fluidly coupled to pump 434 comprise a series of valves and a pressure loop. Hydraulic fluid flow from pump 434 may be directed (with valves of the like) through a pressure loop of compensator/relief 438. In some circumstances, the hydraulic fluid flow is forced through a narrow constriction of the pressure loop, wherein energy of the hydraulic fluid is dissipated as heat prior to returning to the hydraulic reservoir.

Controller 440, pump 434 and compensator/relief 438 serve as part of the vehicle braking control system 422. Controller 440 comprises a processing unit 446 and a non-transitory computer-readable medium 448. Processing unit 446 is configured to receive data signals, analyze such data signals, and output data and control signals. Medium 448 may comprise instructions (in the form of hard-wired circuitry or software) for directing processing unit 446 to carry out method 500 (shown in FIG. 2).

Figure 2:
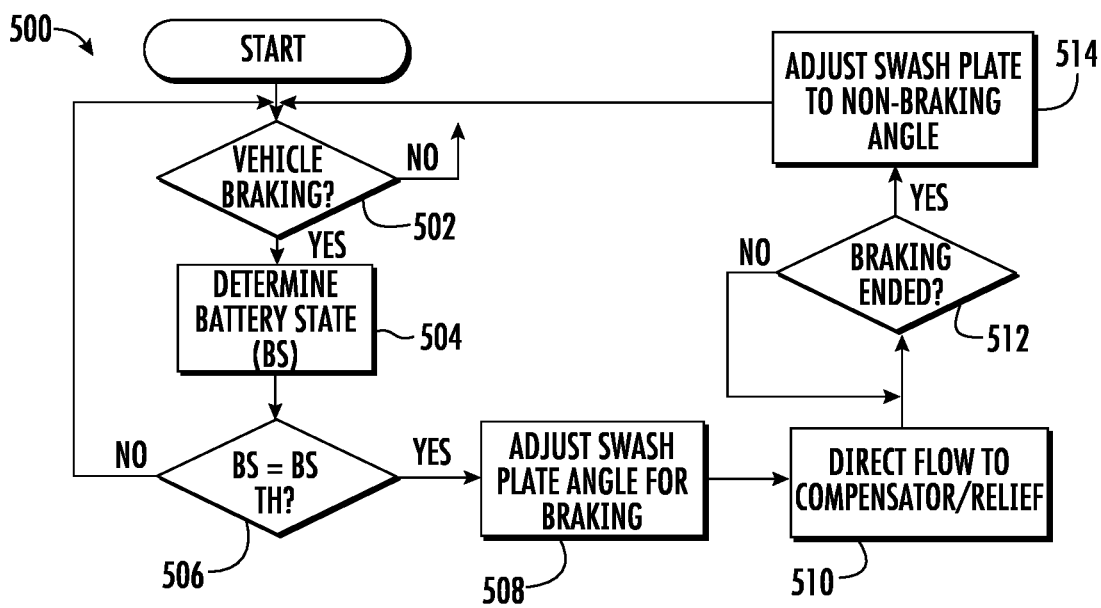
FIG. 2 is a flow diagram of an example vehicle braking method.

FIG. 2 is a flow diagram of an example steering control method 500 that may be carried out by processor 446 of controller 440 based upon instructions provided in memory 448. As indicated by decision block 502, controller 440 determines whether vehicle 420 is undergoing braking. Such a determination may be made based upon the current state of motor 428, whether motor 428 is carrying out regenerative braking, functioning as a generator where electrical charge is being produced or output by motor 428. Such a determination may also or alternatively be made based upon signals from various sensors on vehicle 420 indicating such braking. For example, such braking may be determined based upon changes in the speed of vehicle 420 and the slope of the terrain upon which vehicle 420 is traveling (based upon signals from a camera, inertial motion unit or the like. Determination of braking is carried out by comparing the target speed request either from the hand or the foot throttle and the measured speed on the motor shaft and the wheels using sensors along with the check on the amount of regenerative torque allowed from the motor.

As indicated by block 504, in response to a determination that vehicle 420 is undergoing braking, controller 440 determines the current state of battery 432. In some implementations, the current state of battery 432 may be sensed, such as through the use of a battery sensor 452 (shown in broken lines in FIG. 1). In some implementations, the current state of battery 432 may be determined/estimated by controller 440 based upon a prior historical state of battery 432 and prior historical power draws from battery 432.

As indicated by block 506, controller 440 (processing unit 446 following instructions contained in memory 448) whether the current battery state BS satisfies a predetermined battery state threshold BS TH. As indicated by block 508, in response to the battery state threshold being satisfied, controller 440 automatically outputs control signals causing an adjustment to the angle of swash plate 442 to move the swash plate to an angle that applies a load to motor 4282 facilitate enhanced braking. Increasing the angle of the swash plate increases the load placed upon motor 428. In some implementations, swash plate angle may be adjusted such that a load of at least 25 kW, and in some implementations at least 28 kW, is placed upon motor 428 so as to brake traction members 426 and vehicle 420. The increased angle of swash plate 442 results in pump 434 outputting hydraulic flow at a greater pressure.

In some circumstances, the greater pressure (greater energy) may be at least partially consumed by the hydraulic subsystems 436. As indicated by block 510, any excess pressure or energy is dissipated by the hydraulic flow being directed through compensator/relief 438. In some implementations, hydraulic flow is dead headed against the compensator/relief 438 to dissipate the energy as heat. In some implementations, such hydraulic subsystems 436 may not be consuming any energy or may be disconnected, wherein all of the hydraulic flow produced by pump 434 is directed to compensator 438 for energy dissipation and heat generation. The flow of hydraulic may be controlled by controller 440 outputting control signals to one or more valves which selectively direct the pressurized fluid to the hydraulic subsystems 436 and/or compensator/relief 438.

In some implementations, the state of the battery comprises a state of charge of battery 432. For example, in some implementations, the battery state threshold may comprise a 90% of the capacity of battery 432. In response to battery 432 having a charge of at least 90% of its charging capacity, controller 440 may output control signals increasing the angle of swash plate 442 and increasing the load of pump 434 upon motor 428 to assist with braking of vehicle 420.

In some implementations, the state of the battery comprises a battery maximum cell voltage level. For example, in some implementations, the battery state threshold may comprise a predetermined battery maximum cell voltage level having a value of at least 4250 mV. In response to battery 432 having a voltage of at least 4250 mV, controller 440 may output control signals increasing the angle of swash plate 442 and increasing a load of pump 434 upon motor 428 to assist with braking of vehicle 420.

In some implementations, the state of the battery (BS) determined in block 504 and used as a criteria in block 506 may be a combination of multiple factors, such as a combination of both the current state of charge of battery 432 and the current voltage level of battery 432. In some implementations, the multiple factors may be differently weighted with respect to a determination of whether a battery state threshold value has been satisfied or exceeded. In some implementations, criteria other than state of charge and voltage level may be used in block 504 and 506.

As indicated by block 512, during such braking assistance provided by pump 434, controller 440 monitors the current braking state of vehicle 420. For example, controller 440 may monitor the charge output or input of motor 428. Controller 440 may evaluate operator controls or commands for such braking to determine when such braking has been ended. Controller 440 may evaluate whether such braking is continuing as discussed above with respect to block 502.

As indicated by block 514, in response to determining that such braking has ended, controller 440 may output control signals to pump 434 causing the angle of swash plate 442 to be once again adjusted to a non-braking angle. The non-braking angle is an angle at which the angle swash plate 442 is such that pump 434 produces sufficient hydraulic flow for powering any of hydraulic subsystems 436, but wherein excess hydraulic flow that might otherwise be directed to compensator/relief 438 is reduced or eliminated. In circumstances where the hydraulic subsystems 436 are not consuming any energy from hydraulic flow, swash plate 442 may be actuated to a zero angle.

Figure 3:
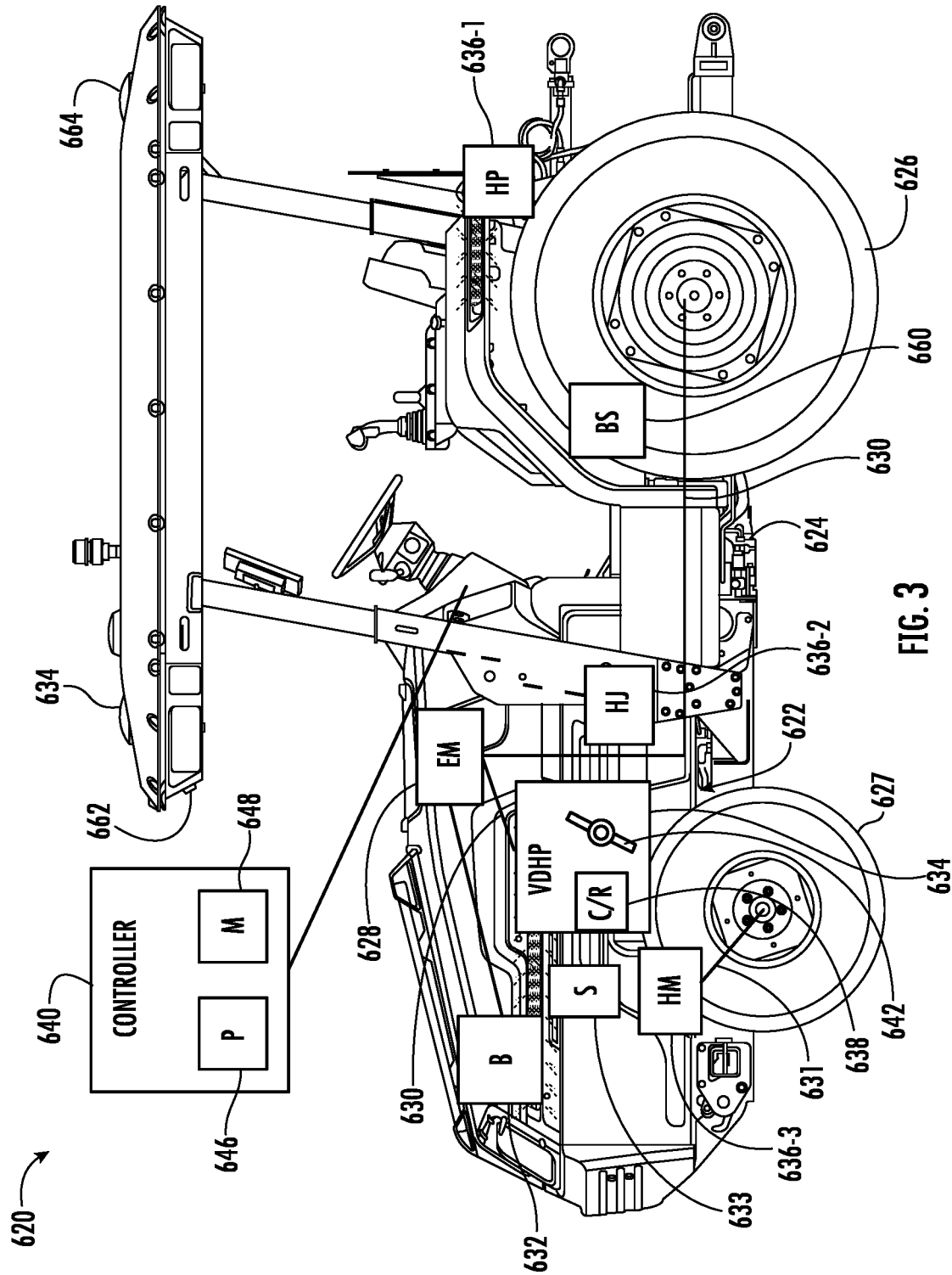
FIG. 3 is a side view illustrating portions of an example vehicle having an example vehicle braking system.

FIG. 3 is a side view of an example electrically driven or propelled vehicle 620 comprising an example a vehicle braking control system 622 for carrying out an example steering control method 500 (shown in FIG. 2). Vehicle 620 is in the form of an agricultural vehicle (a tractor).

Vehicle braking control system 622 facilitates continued braking of the vehicle 620 in circumstances where regenerative braking is not available or is less effective. Vehicle braking control system 622 dissipates kinetic energy of the vehicle 620 during braking into heat or other forms by using a continuously variable hydraulic pump and adjusting the angle of its swash plate to impose a load upon the electric motor, wherein the resulting pressurized hydraulic fluid is forced through a narrow constriction or a main relief, producing the heat. The load imposed upon the motor assists in slowing the vehicle down in a controlled and smooth manner. This load may also assist in speed control of the vehicle when the vehicle is traveling upon a gradient.

Vehicle 620 comprises frame 624, driven traction members 626, electric traction motor 628, transmission 630, battery 632, battery sensor 633, variable displacement hydraulic pump 634, hydraulic subsystems 636-1, 636-2 and 636-3 (collectively referred to as subsystems 636), compensator/relief 638 and controller 640. Electric traction motor 628, transmission 630, battery 632, pump 634, hydraulic subsystems 636 and compensator/relief 638 comprise commercially available components and are schematically illustrated for ease of illustration. Frame 624 rotatably or movably supports ground engaging or traction members 626 which may be in the form of wheels or tracks. In the illustrated example, driven traction members 626 are located at a rearward portion of vehicle 620. In other implementations, driven traction members 626 are located at a forward portion of vehicle 620.

Electric traction motor 628 comprises an electric motor operably coupled to driven traction members 626 by transmission 630 and operably coupled to variable displacement hydraulic pump 634 by transmission 630. Transmission 630 transmits torque from motor 628 to drive or propel traction members 626. In the illustrated example, transmission 630 further transmits torque from motor 628 to pump 634 to drive pump 634. Electric traction motor 628 is supplied with electrical power or energy from battery 632.

Battery 632 may comprise a battery pack comprising several sets of rechargeable batteries of sufficient power and sized to electrically power motor 628 so as to generate sufficient torque for propelling vehicle 620. Transmission 630 is configured such that during braking of vehicle 620, electric traction motor 628 functions as a generator producing electrical power which may be used to recharge battery 632 (referred to as regenerative braking).

Battery sensor comprises at least one sensor configured to output signals indicating a state of battery 632. The state of the battery 632 comprises a battery maximum cell voltage level. For example, in some implementations, the battery state threshold may comprise a predetermined battery maximum cell voltage level for battery 632 and may have a value of at least 4250 mV. Examples of battery sensor 633 include: negative temperature coefficient (NTC) thermistors, hall effect current sensors and voltage measurement circuits.

Variable displacement hydraulic pump 634 comprises a pump configured to supply pressurized hydraulic fluid flow to hydraulic subsystems 636 and/are compensator/relief 638. Hydraulic pump 634 comprises a swash plate 642 (schematically illustrated) which is operably coupled to motor 428 so as to be rotatably driven by torque output by motor 428. This load is imposed by adjusting the oil flow and the pressure drop of the hydraulic fluid flowing through the output of pump 434.

Hydraulic subsystems 436 comprise systems of vehicle 620 or external systems powered by the hydraulic pump 634 of vehicle 620. Hydraulic subsystem 636-1 comprises at least one hydraulic coupling port configured to supply pressurized hydraulic fluid to external vehicles or components. For example, the hydraulic ports of hydraulic subsystems 636-1 may be connectable to hydraulic hoses which transmit pressurized hydraulic fluid to a hydraulic motor or hydraulic jacks (hydraulic cylinder-piston assemblies) on an implement that is to be pulled by vehicle 620.

Hydraulic subsystem 636-2 comprises ports or other fluid connections for connection to a hydraulic jacks associate with vehicle 620. For example, in some implementations, vehicle 620 may be equipped with lift arms for releasable connection to functional tools such as a bucket, a pallet fork, a bale spear or the like. Such lift arms may be raised and lowered with hydraulic jacks supplied with hydraulic fluid by hydraulic subsystem 636-2.

Hydraulic subsystems 636-3 comprises a hydraulic motor. The hydraulic motor generates torque. In the example illustrated, hydraulic motor of hydraulic subsystems 636-3 is operably coupled to front traction members 627 by transmission 631 to rotatably drive the front traction members 627. In the example illustrated, this provides vehicle 620 with four-wheel-drive. In some implementations, one or more of subsystem 636 may be omitted or may be supplied with hydraulic power by a separate additional hydraulic pump that is driven by a separate additional electric motor.

In some implementations, each of such subsystem 636 may be omitted, wherein pump 634 is used solely for braking.

Compensator/relief 638 is fluidly coupled to pump 634 are provided as part of pump 634. Compensator/relief 638 comprises a series of valves and a pressure loop. Hydraulic fluid flow from pump 634 may be directed (with valves of the like) through a pressure loop of compensator/relief 638. In some circumstances, the hydraulic fluid flow is forced through a narrow constriction of the pressure loop, wherein energy of the hydraulic fluid is dissipated as heat prior to returning to the hydraulic reservoir.

Controller 640, pump 634 and compensator/relief 638 serve as part of the vehicle braking control system 622. Controller 640 comprises a processing unit 646 and a non-transitory computer-readable medium 648. Processing unit 646 is configured to receive data signals, analyze such data signals, and output data and control signals. Medium 648 may comprise instructions (in the form of hard-wired circuitry or software) for directing processing unit 646 to carry out method 500 (shown in FIG. 2).

As indicated by decision block 502 in FIG. 2, controller 640 determines whether vehicle 620 is undergoing braking. Such a determination may be made based upon the current state of motor 628, whether motor 628 is carrying out regenerative braking, functioning as a generator where electrical charge is being produced or output by motor 628. Such a determination may also or alternatively be made based upon signals from various sensors on vehicle 620 indicating such braking. In the example illustrated, vehicle 620 comprises various sensors in the form of braking sensor 660, camera 662 and inertial measurement units 664.

Braking sensor 660 (schematically illustrated) comprises one or more sensors that sense braking of traction members 626. Braking sensor 660 may comprise one or more sensors that detect actuation of braking pads. Braking sensor 60 may comprise one or sensors that sense torque or strain experience by traction members 626 or transmission 630. Camera 662 may capture be used by controller 640 to identify vehicle 620 is undergoing braking. Inertial measurement units 634 include accelerometers and gyroscopes, wherein signals from the accelerometer may indicate a deceleration that exceeds a predetermined threshold so as to indicate vehicle 620 in a braking state. Signals from inertial measurement units 634 may further indicate a pitch of vehicle 620 (or a corresponding slope of the underlying terrain) that exceeds a predetermined threshold, wherein the indicated pitch along with other factors may result in controller 640 determining that vehicle 620 is in a braking state. Determination of braking may also be determined by controller 640 by comparing the target speed request either from the hand or the foot throttle and the measured speed on the motor shaft and the wheels using sensors along with the check on the amount of regenerative torque allowed from the motor.

As indicated by block 504 in FIG. 2, in response to a determination that vehicle 620 is undergoing braking, controller 640 determines the current state of battery 632. In some implementations, the current state of battery 632 may be sensed, such as through the use of a battery sensor 633. In some implementations, the current state of battery 632 may be determined/estimated by controller 640 based upon a prior historical state of battery 632 and prior historical power draws from battery 632.

As indicated by block 506 in FIG. 2, controller 440 (processing unit 646 following instructions contained in memory 648) whether the current battery state BS satisfies a predetermined battery state threshold BS TH. As indicated by block 508, in response to the battery state threshold being satisfied, controller 640 automatically outputs control signals causing an adjustment to the angle of swash plate 642 covering the adjustment is to move the swash plate to an angle that applies a load to motor 628 to facilitate enhanced braking. Increasing the angle of the swash plate increases the load placed upon motor 628. In some implementations, swash plate angle may be adjusted such that a load of at least 25 KW, and in some implementations at least 28 KW, is placed upon motor 628 so as to brake traction members 626 and vehicle 620. The increased angle of swash plate 642 results in pump 634 outputting hydraulic flow at a greater pressure.

In some circumstances, the greater pressure (greater energy) may be at least partially consumed by the hydraulic subsystems 636. As indicated by block 510, any excess pressure or energy is dissipated by the hydraulic flow being directed through compensator/relief 638. In some implementations, hydraulic flow is dead headed against the compensator/relief 638 to dissipate the energy as heat. In some implementations, such hydraulic subsystems 636 may not be consuming any energy or may be disconnected, wherein all of the hydraulic flow produced by pump 634 is directed to compensator 638 for energy dissipation and heat generation. The flow of hydraulic may be controlled by controller 640 outputting control signals to one or more valves which selectively direct the pressurized fluid to the hydraulic subsystems 636 and/or compensator/relief 638.

In some implementations, the state of the battery comprises a state of charge of battery 632. For example, in some implementations, the battery state threshold may comprise a 90% of the capacity of battery 632. In response to battery 632 having a charge of at least 90% of its charging capacity, controller 640 may output control signals increasing the angle of swash plate 642 and increasing the load of pump 634 upon motor 628 to assist with braking of vehicle 620.

In some implementations, the state of the battery comprises a battery maximum cell voltage level. For example, in some implementations, the battery state threshold may comprise a predetermined battery maximum cell voltage level having a value of at least 4250 mV. In response to battery 632 having a voltage of at least 4250 mV, controller 640 may output control signals increasing the angle of swash plate 642 and increasing a load of pump 634 upon motor 628 to assist with braking of vehicle 620.

In some implementations, the state of the battery (BS) determined in block 504 and used as a criteria in block 506 may be a combination of multiple factors, such as a combination of both the current state of charge of battery 632 and the current voltage level of battery 632. In some implementations, the multiple factors may be differently weighted with respect to a determination of whether a battery state threshold value has been satisfied or exceeded. In some implementations, criteria other than state of charge and voltage level may be used in block 504 and 506.

As indicated by block 512 in FIG. 2, during such braking assistance provided by pump 634, controller 640 monitors the current braking state of vehicle 620. For example, controller 640 may monitor the charge output or input of motor 628. Controller 640 may evaluate operator controls or commands for such braking to determine when such braking has been ended. Controller 640 may evaluate whether such braking is continuing as discussed above with respect to block 502.

As indicated by block 514 in FIG. 2, in response to determining that such braking has ended, controller 640 may output control signals to pump 634 causing the angle of swash plate 642 to be once again adjusted to a non-braking angle. The non-braking angle is an angle at which the angle swash plate 642 is such that pump 634 produces sufficient hydraulic flow for powering any of hydraulic subsystems 636, but wherein excess hydraulic flow that might otherwise be directed to compensator/relief 638 is reduced or eliminated. In circumstances where the hydraulic subsystems 436 are not consuming any energy from hydraulic flow, swash plate 642 may be actuated to a zero angle.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vehicle comprising:
   an electric motor;
   a variable displacement hydraulic pump having a swash plate;
   driven traction members;
   a transmission operably coupling the electric motor to the driven traction members and to the hydraulic pump;
   a hydraulic pressure consumer fluidly coupled to an output of the hydraulic pump;
   a battery to receive energy produced by the electric motor during braking of the driven traction members by the electric motor;
   a controller configured to adjust an angle of the swash plate in response to a sensed state of the battery and braking of the driven traction members.

2. The vehicle of claim 1, wherein the sensed state of the battery comprises a state of charge of the battery, wherein the controller is configured to adjust the angle of the swash plate in response to the state of charge of the battery exceeding a predetermined battery charge level.

3. The vehicle of claim 2, wherein the predetermined battery charge level comprises 90% battery.

4. The vehicle of claim 1, wherein the sensed state of the battery comprises a maximum cell voltage level of the battery, wherein the controller is configured to adjust the angle of the swash plate in response to the maximum cell voltage level of the battery exceeding a predetermined battery voltage level.

5. The vehicle of claim 4, wherein the maximum cell voltage level of the battery comprises a value of at least 4250 mV.

6. The vehicle of claim 1, wherein the controller adjusts the angle swash plate to provide a load up to 25 KW to the electric motor.

7. The vehicle of claim 1, wherein the hydraulic pump comprises a compensator having an internal pressure loop and a relief valve against which hydraulic fluid flow from the hydraulic pump is forced through a narrow passage provided by the pressure loop to generate a heat load.

8. The vehicle of claim 1, wherein the hydraulic pump is fluidly disconnected from the hydraulic pressure consumer during braking of the driven traction members by the hydraulic pump.

9. The vehicle claim 1, wherein the hydraulic pump is fluidly connected to the hydraulic pressure consumer during braking of the driven traction members by the hydraulic pump.

10. The vehicle of claim 1, wherein the hydraulic pressure consumer comprises a hydraulic cylinder-piston assembly for raising and lowering an attachment of the vehicle.

11. The vehicle of claim 1, wherein the sensed state of the battery comprises a combination of a current state of charge of the battery and a current voltage level of the battery.

12. The vehicle claim 1 further comprising a battery sensor selected from a group of battery sensors consisting of: a negative temperature coefficient thermistor, a Hall effect current sensor and a voltage measurement circuit.

13. The vehicle of claim 1, wherein the hydraulic pressure consumer comprises a hydraulic coupling port configured to supply pressurized hydraulic fluid to external vehicles or components.

14. A vehicle braking method comprising:
   determine braking by a vehicle;
   determine a battery state of a battery used to propel the vehicle;
   in response to the battery state satisfying a predetermined threshold, adjusting a swashplate angle of a variable displacement hydraulic pump to a braking angle; and
   in response to the battery state satisfying the predetermined threshold, directing flow from the variable displacement hydraulic pump to a compensator/relief.

15. The vehicle braking method of claim 14 further comprising:
   determining an end to the braking by the vehicle; and
   in response to the braking by the vehicle ending, adjusting the swashplate angle of the variable displacement hydraulic pump to a non-braking angle.

16. A non-transitory computer-readable medium containing instructions to direct the processor to:
   determine braking by a vehicle;
   determine a battery state of a battery used to propel the vehicle;
   in response to the battery state satisfying predetermined threshold, output control signals to adjust a swashplate angle of a variable displacement hydraulic pump to a braking angle; and
   in response to the battery state satisfying the predetermined threshold, output control signals directing flow from the variable displacement hydraulic pump to a compensator/relief.

17. The medium of claim 16, wherein the instructions are further configured to direct the processor to:
   determine an end to the braking by the vehicle; and
   in response to the braking by the vehicle ending, output control signals to adjust the swashplate angle of the variable displacement hydraulic pump to a non-braking angle.

* * * * *